May 23, 1961
J. W. SHIPP
2,985,246
DISK TILLER
Filed June 20, 1957
3 Sheets-Sheet 1
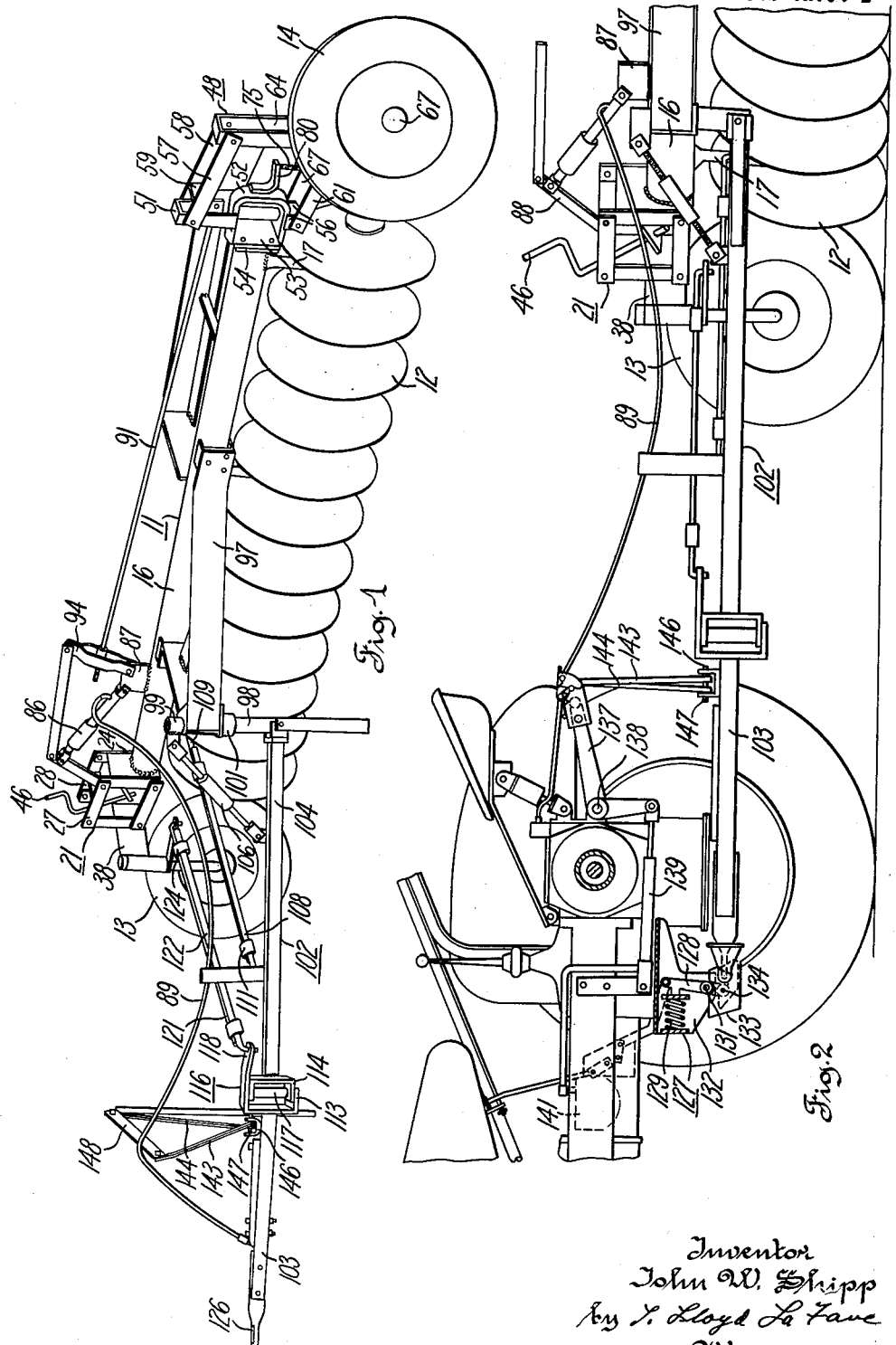
Inventor
John W. Shipp
By J. Lloyd LaFave
Attorney

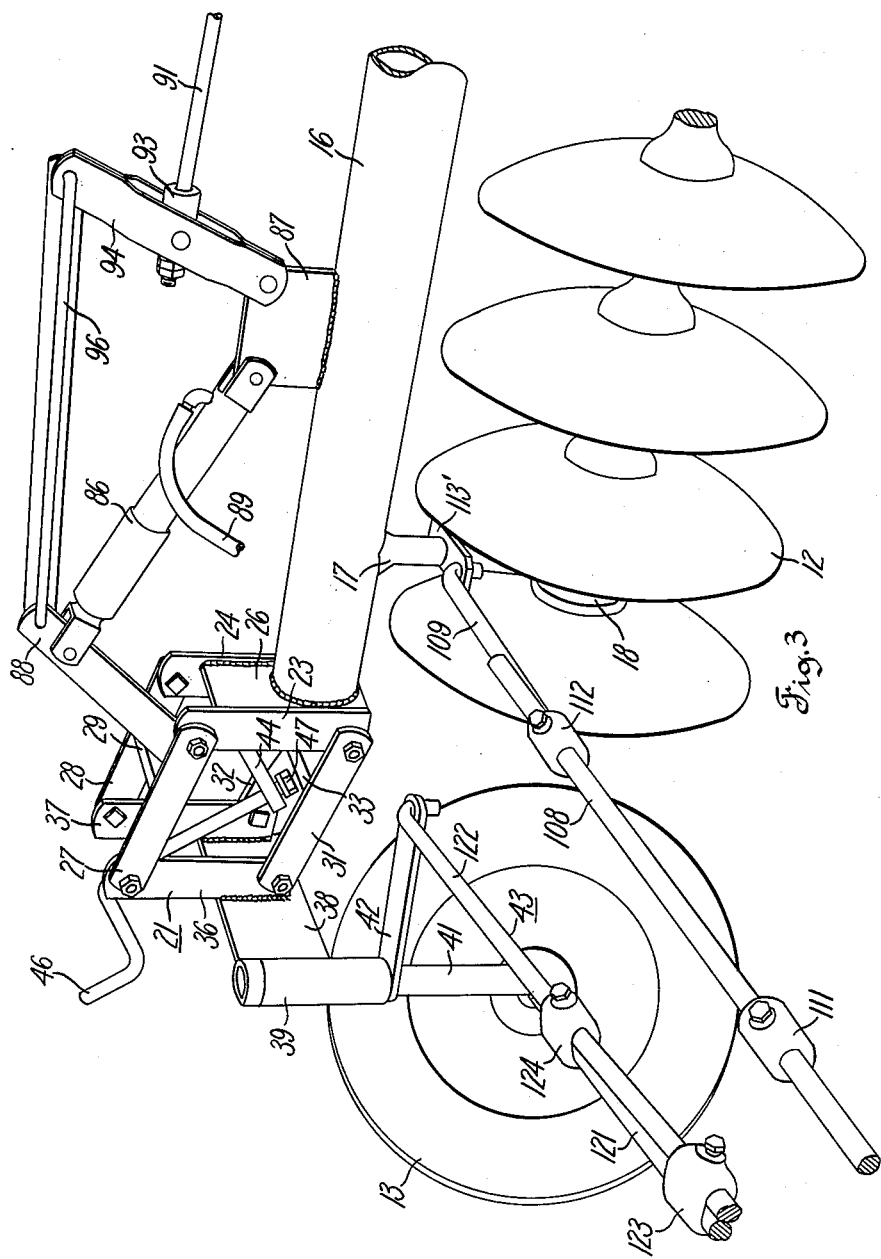

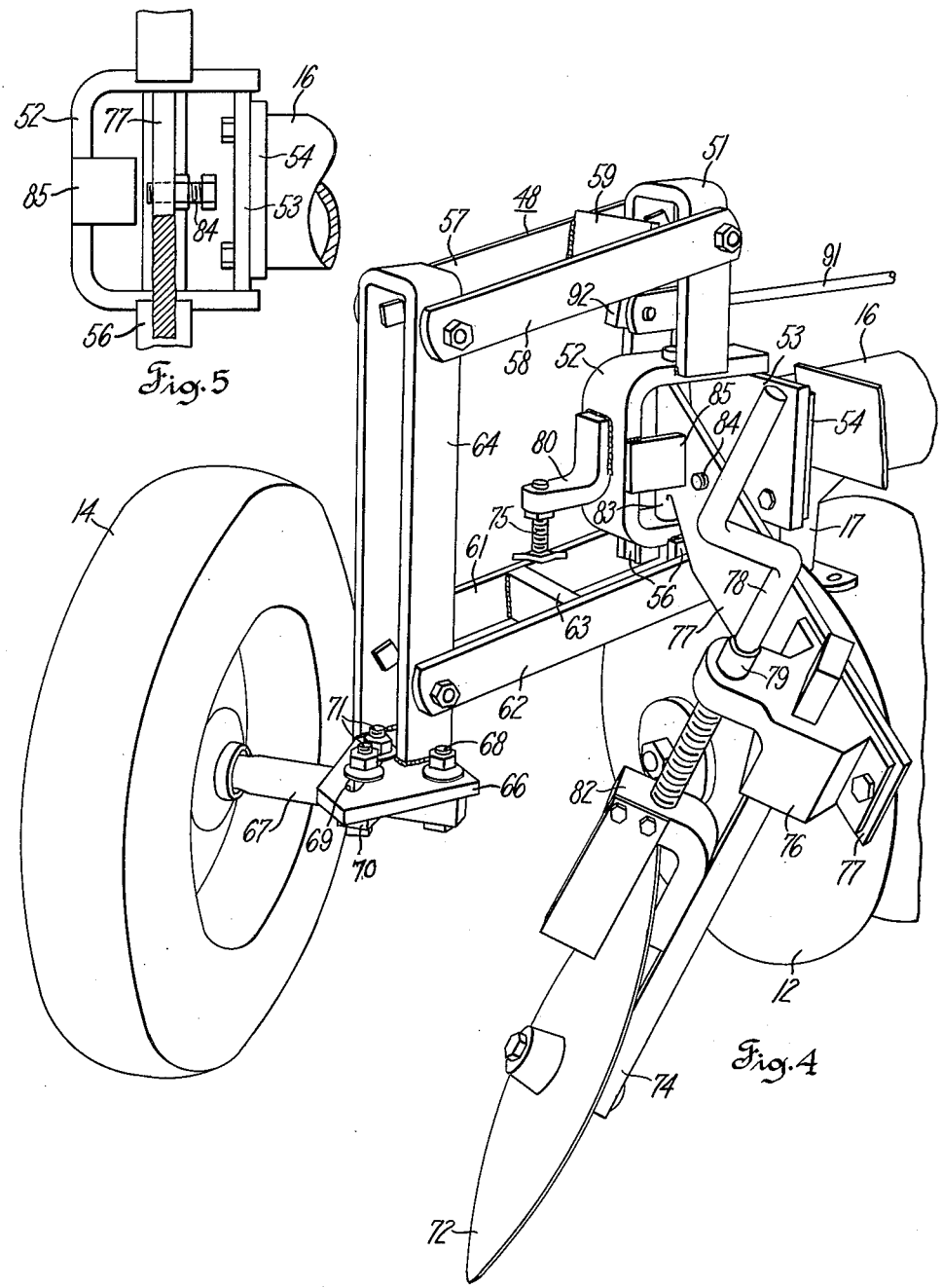

United States Patent Office 2,985,246
Patented May 23, 1961

2,985,246

DISK TILLER

John W. Shipp, Athens, Tenn., assignor to Athens Plow Company, Athens, Tenn.

Filed June 20, 1957, Ser. No. 666,986

5 Claims. (Cl. 172—316)

This invention relates to an agricultural implement of a type such as a disk tiller plow.

A disk tiller such as contemplated by the present invention has a frame that extends diagonally in the direction of implement travel and carries a number of axially aligned cutting disks. The elongated frame extends a considerable distance behind the tractor and is supported at its rear end by a land wheel and at its front end by a steerable furrow wheel. A steering mechanism associated with the implement hitch steers the furrow wheel to cause the implement to follow in the path of the tractor and to turn in response to turning movement of the tractor. The land and furrow wheels are movable up and down relative to the disks so that the disks may be disposed in a lowered soil working position and may be raised to a transport position. Heretofore the mechanism for raising and lowering the disks relative to the land and furrow wheels has been relatively complex and therefore not entirely satisfactory.

An object of the present invention is the provision of the new and improved disk tiller having a land wheel and a furrow wheel at opposite ends of the tiller frame and supported by individual linkages for vertical movement relative to the tiller frame.

Another object of the invention is the provision of a disk tiller having a land wheel and a furrow wheel at opposite ends of the tiller frame and supported by individual parallel linkages.

Another object of the invention is the provision of individual linkages extending in the line of the tiller frame and supporting land and furrow wheels at opposite ends of the frame.

Another object of the invention is the provision of an improved steerable one way disk tiller that is adapted for connection in semimounted trailing relation to a tractor in which the disk tiller has land and furrow wheels supported by individual parallel linkages operable together for raising and lowering the tiller frame between a raised transport position and a lowered soil working position.

Another object of the invention is to provide a disk tiller having a simplified combination of hitch and power lift structure that makes the implement compact, durable and economical to manufacture.

Other objects and advantages of the invention may be apparent upon a reading of the following description taken with the accompanying drawings, in which:

Fig. 1 is a perspective view of a one way disk tiller embodying features of the present invention;

Fig. 2 is a view of a rear portion of a tractor with the near traction wheel removed showing the disk tiller of Fig. 1 attached in semimounted relation to the tractor;

Fig. 3 is an enlarged perspective view of a forward portion of the disk tiller of Fig. 1 and showing details of its furrow wheel mounting;

Fig. 4 is an enlarged perspective view of a rearward portion of the disk tiller of Fig. 1 showing details of its land and coulter wheel mountings; and Fig. 5 is a view of a portion of the coulter mounting shown in Fig. 4 with parts thereof broken away.

Referring to the drawing the features of the invention are embodied in a one way disk tiller, Fig. 1, that in general, includes a frame structure 11, gangs of disks 12, supporting wheels 13, 14, and a hitch device adapted for connection to a draft transmitting member of a tractor.

The frame structure comprises a longitudinally extending beam 16 disposed generally diagonally of the direction of implement travel. Standards 17 for supporting the disk gangs 12 depend downwardly from the beam and are rigidly secured to the beam. The lower end of each standard supports a self-aligning bearing assembly 18 comprising a bearing yoke pivotally mounted on the standard for swinging movement about the vertical axis of the standard. A bearing, not shown, has diametrically opposite extending studs which extend through trunnion sleeves disposed in apertures in the legs of the yoke. The shafts for supporting the disk gangs are each journaled in a pair of such bearings. The disks are suitably mounted on the shaft and rotate as a unit with the shaft.

Wheel 13 is a furrow wheel and part of a furrow wheel assembly for supporting the forward end of the frame. The furrow wheel assembly comprises a parallel linkage structure 21 that supports an axle for the furrow wheel. The parallel linkage structure 21 includes a pair of laterally spaced vertical members 23, 24 defining a vertical link and are rigidly secured to the forward end of beam 16 as to be a part of the frame such as by being welded to the sides of a plate in turn welded to an end plate 26 welded to the end of the beam. A pair of upper laterally spaced members 27, 28 define an upper link and are pivotally connected to the upper ends of the spaced members of the fixed vertical link. These upper links are rigidly united with each other by a cross plate 29. A pair of lower laterally spaced members 31, 32 define a lower link and are pivotally connected to the lower ends of a fixed vertical link members. Those lower link members are rigidly united with each other by a cross plate 33. The upper and lower link members extend forward and longitudinally of the beam 16 and are pivotally secured in substantially parallel relation to each other respectively by a pair of laterally spaced members 36, 37 defining a movable vertical link.

A supporting arm 38 for a vertically disposed sleeve bearing 39 is rigidly secured to both the vertical link members 36, 37 for vertical up and down movement with the vertical links.

The axle for the furrow wheel has an inclined portion on which the furrow wheel is journaled and a vertical portion 41 that is journaled in the bearing sleeve and secured thereto for rotation about the vertical axis of the bearing sleeve 39. A furrow wheel steering arm 42 is secured to the vertical portion 41 of the axle and extends radially therefrom. A longitudinally adjustable tie means 43 connects the free end of steering arm 42 to a steering arm on the hitch device later described herein.

Front stop means limiting the vertical swinging movement of the furrow wheel parallel linkage comprises a stop supporting plate 44 secured to the end plate 26 so as to be a rigid part of the frame 11 and is disposed in overlying relation to the crossbar 33 of the pair of laterally spaced lower link members 31, 32. A crank screw 46 extends through the stop supporting plate 44 in threaded engagement therewith. The lower end of the crank screw 46 is provided with a jam nut 47 to adjustably secure the crank screw to plate 44. Crank screw 46 abuts the surface of the crossbar 33 of the lower links to limit upward swinging movement of the linkage relative to the frame. The front stop means can thus be adjusted so that it locks the frame in elevated or transport position and it can be adjusted so that it serves as a stop to limit the lower operating depth of the disks.

Wheel 14 is a land wheel and part of a land wheel assembly for supporting the rearward end of the frame. The land wheel assembly comprises a parallel linkage structure 48 on the general order of the parallel linkage structure 21 for the furrow wheel assembly. The land wheel parallel linkage structure 48 comprises a vertical link having an upper portion 51 that is mounted on a U-shaped mounting bracket 52 whose legs are welded to a plate 53 bolted to an end plate 54 welded to the rear end of beam 16. Upper member 51 is U-shaped and has legs welded to opposite sides of the upper leg of the U-shaped bracket. A pair of depending lugs 56 welded to opposite sides of the lower leg of the U-shaped bracket 52 form a lower portion of the fixed vertical link. A pair of upper laterally spaced members 57, 58 define an upper link of the parallel linkage and are pivotally connected to the upper portion 51 of the fixed vertical link. A cross member 59 rigidly unites both upper members of the upper link. A pair of lower laterally spaced members 61, 62 define a lower link and are pivotally connected to the lugs 56 (Fig. 1) which form the lower portion of the fixed vertical link. A cross bar 63 rigidly unites both members 61, 62 of the lower link. The upper and lower links extend rearward and longitudinally of the beam 16 and are pivotally secured in substantially parallel relation to each other by a vertically disposed U-shaped member 64 which serves as the movable vertical link.

The legs of the vertical link 64 extend downward and serve as a standard for a land wheel mounting. A horizontal gusset plate 66 is secured as by welding to the bottom of the legs of the vertical link standard 64.

The land wheel is journaled on the axle 67 having a square shaft portion that extends horizontally and has a free end secured by a vertically disposed bolt 68 that extends through the free end of the shaft and the plate 66. Bolt 68 serves as a pivot about which the shaft 67 may be horizontally adjusted to vary the angular position of the land wheel relative to the frame. The pivot axis afforded by bolt 68 is spaced from a slot 69 in plate 66. Slot 69 may be an arcuate slot concentric with the axis of the bolt 68, but preferably as shown, Fig. 4, slot 69 is a straight slot through which clamping means extends. This clamping means comprises a plate 70 disposed under the axle 67 and is secured by bolts 71 which extend through the slot 69 such that when adjusting the angular position of the land wheel the clamping means slides longitudinally of the land wheel axle. When the bolts 71 are disposed forward in the slot 69 the land wheel is in an angular position for transport and the trailing width of the disk tiller is relatively narrow, and when the clamping bolts are disposed toward the rearward end of the slot 69 the land wheel is angled relative to the frame for a soil working position of the disk tiller and its trailing width is relatively wide.

Rear stop means limiting the vertical swinging movement of the land wheel parallel linkage comprises a rear depth stop screw 75 in a flange 80 welded to the U-shaped bracket 52. The stop screw 75 overlies the crossbar 63 between members 61, 62 of the lower link and engages the crossbar 63 to limit upward swinging of the parallel linkage according to the adjusted extension of the depth stop screw and thereby functions so that the land wheel and stop means serve to limit the operating depth of the disks at the rear end of the frame.

The angular position of the soil working disks results in a side thrust which is taken up by a stabilizing member or trailing coulter 72, Fig. 4, riding in the furrow made by the rearwardmost disk. The coulter 72 is mounted on a stub axle that is secured to a standard 74. The standard is slidable in a socket receiving support 76 that is rigidly secured to a trailing support arm 77. A screw crank 78 extends through a portion of the socket support 76 and is secured above and below the socket support by collars 79 adjustably secured to the screw crank. The lower end of the screw crank 78 is pivotally secured to a flange 82 rigid with the standard 74. Vertical adjustment of the screw crank therefore adjusts the vertical spacing between the coulter and the coulter support arm so that the operating depth of the coulter may be adjusted.

The forward end of the support arm includes a vertical sleeve member 83 disposed in the U-shaped bracket 52 and pivotally secured thereto by a bolt that extends through the legs of the bracket. Swinging movement of the coulter arm 77 to the left, viewed from the rear, is limited by a first stop member or stop block 85 on the bracket 52 adjacent the left side of the coulter support arm. Adjustable stop means comprises a second stop member or machine screw 84 secured in threaded engagement with the right side of the coulter support arm and positioned to abut the mounting plate 53 to limit the swinging movement of the coulter support arm to the right.

Power lift means for raising and lowering the tiller frame relative to both the land and furrow wheels includes in combination with the wheel assemblies a single hydraulic ram 86. The hydraulic ram is disposed adjacent the forward end of the frame with one end pivotally connected for vertical swinging movement to an upright 87 welded to the beam 16. The other end of the hydraulic ram is pivotally connected for vertical swinging movement to the upper end of an arm 88 whose lower end is rigidly secured to the crossbar 29 between the members 27, 28 which form the upper link of the furrow wheel parallel linkage. Suitable means such as a hose 89 is adapted for connection to a hydraulic circuit on the tractor manually controlled by the tractor operator to supply fluid under pressure to the remote hydraulic ram 86 on the disk tiller.

Means interconnecting the land and furrow wheel parallel linkages for operation together comprises tie rods 91, 96 and an arm 88. Tie rod 91 is pivotally connected at a rearward end to a downwardly extending arm 92 that is rigid with the crossbar 59 between the members 57, 58 of the upper link of the land wheel assembly so that tension on the tie rod causes lowering of the land wheel parallel linkage 48. Tie rod 91 is connected to tie rod 96 through a lost motion connection. The lost motion connection comprises link 94, plate 87 and trunnion sleeve 93. The forward portion of tie rod 91 extends through trunnion sleeve 93 for slidable engagement therewith. Trunnion sleeve 93 is pivotally supported intermediate the ends of link 94. A pair of jam nuts are secured on a forward threaded end of tie rod 91 to abut trunnion sleeve 93 when the tie rod is under tension. This arrangement permits the furrow wheel, the land wheel, or disks, to raise independently of each other due to irregularities in the surface of the land. Link 94 has a lower end pivotally connected to upright member 87 and an upper end pivotally connected to one end of another generally horizontal tie rod 96. Tie rod 96 is pivotally connected at its other end to the upper end of the arm 88 adjacent its pivot connection with the hydraulic ram 86. The linkage is thus constructed and arranged such that extension of the hydraulic ram will simultaneously swing both the individual parallel linkages downward relative to the frame, and the linkages are proportioned to take up the differences in amount of vertical movement required between the furrow and land wheels between the lowered soil working position of the disks and their raised transport position.

The frame for the disk tiller includes a centrally located V-shaped structure 97 (Fig. 1) converging forwardly for supporting the hitch structure. A tubular post 98 is journaled in the apex of the V-shaped structure and is secured by collars 99, 101 disposed above and below the V-shaped frame. A forward extending draft transmitting member 102 comprises a forward portion or drawbar 103 and a rearward portion or tongue 104. The rearward end of tongue 104 is pivoted to the lower portion of the post 98 for vertical swinging movement therewith. A longitudinally adjustable turnbuckle member serving as a beaming screw 106 has one end pivotally connected to the implement tongue at a point spaced from the post 98 and has its other end pivotally connected to the collar 99 at the top of the post so that vertical swinging adjustment of the tongue 104 relative to the post is obtained upon adjustment of the beaming screw.

The implement tongue 104 is laterally swingable about the axis of post 98 and is secured laterally by a longitudinally adjustable brace made up of overlapping rods 108, 109 (Fig. 3) secured by adjustable clamps 111, 112. One end of the brace is pivotally connected to the implement tongue 104 and the other end is pivotally connected to a flange 113' mounted on a bearing standard 17 near the forward end of beam 16. The tongue and the drawbar are connected by a vertical pivot means which permits relative lateral swinging movement but restrains any relative vertical movement. The vertical pivot means comprises a U-shaped clevis 113 rigid with the rear of the drawbar which receives a U-shaped clevis 114 rigid with the forward end of the implement tongue. A vertical pivot pin (not shown) extends through the legs of both clevises and through a tube 117 welded between the legs of clevis 114 to pivotally unite the two clevises.

The drawbar clevis 113 has an upper leg 118 that extends rearwardly beyond vertical pivot 116 and which also extends diagonally of the line of the drawbar to serve as a drawbar steering arm for the furrow wheel 13. A tie connection between the drawbar steering arm 118 and the furrow wheel steering arm 42 is provided by a pair of overlapping rods 121, 122 which are detachably secured together by clamps 123, 124. Opposite ends of this tie connection are pivotally secured to the ends of the steering arms.

The drawbar 103 has a forward hitch portion including an eye 126 adapted for connection to a draft transmitting member on a tractor, Fig. 2.

The tractor is conventional and has a hitch yoke 127 (Fig. 2) depending from its main body. The hitch yoke comprises a draft control lever 128 biased by a spring 129 and pivotally supported on a pin 131 extending through a bracket 132 rigid with the tractor. A quick hitch coupler 133 is attached by a pin 134 to lever 128 and the coupler includes a latch member or draft hook that detachably engages the eye 126 of the drawbar. Laterally spaced power lift arms 137 are mounted on a rock shaft 138 on the tractor and are operatively connected to a hydraulic actuating mechanism including a ram 139, a pump 141, and a valve mechanism, not shown, manually controlled to permit manual or automatic control of the lift arms in response to the draft load on the tractor, as shown in U.S. Patent 2,779,604, W. L. Voegeli, January 29, 1957.

The drawbar 103 is also provided with a lift bail adapted for connection to the power lift arms on the tractor. The lift bail structure comprises a pair of diagonal lift links 143, 144 which are secured together and to the drawbar bracket 146 by a pin 147. The upper spaced ends of the lift links are braced by a cross member 148 and each free end of the lift links mounts a socket pin (not shown) adapted to be latched in the jaws of the lift arms 137 on the tractor.

In operation the lift bail holds the drawbar 103 laterally rigid and lateral swinging movement of the implement relative to the tractor occurs at vertical pivot 116. Steering arm 118 being rigid with the drawbar, which is held laterally rigid with the tractor, effects a positive and effective steering response so that the disk tiller accurately follows the turning movement of the tractor. The lift bail moreover serves as a means of transmitting lift to the implement through an articulated but vertically rigid draft transmitting member in response to either manual control means on the tractor or in response to a well known draft responsive mechanism which operates the hydraulic system to apply a predetermined lift to the implement for the purpose of transferring implement weight to the tractor as needed for improved traction.

An embodiment of a one way disk tiller having improved and simplified structure including land and furrow wheel lift means has been shown and described and it may be obvious to those skilled in the art that various changes may be made therein within the spirit of the invention and within the scope of the appended claims.

What is claimed is:

1. A one way disk tiller plow adapted for connection in semimounted trailing relation to a tractor, said disk tiller plow comprising a diagonally extending frame, a gang of disks mounted on said frame in axially aligned relation; a first vertically swingable parallel linkage structure longitudinally extending the forward end of said frame and presenting a vertical spindle receiving sleeve movable up and down relative to said frame, a furrow wheel having an axle with a vertical spindle portion mounted in said sleeve, means operable to adjust the rotative position of said spindle in said sleeve; a second vertically swingable parallel linkage structure longitudinally extending the rearward end of said frame and including a link movable vertically up and down relative to said frame, a horizontal plate rigidly secured to said link that is movable vertically; a land wheel having an axle; vertical pivot means securing a free end of said land wheel axle to said plate, said plate having an arcuate slot concentric with the axis of said vertical pivot means; clamping means positioned in said arcuate slot and cooperative with said vertical pivot means to secure said land wheel axle rigid with said plate, said clamping means being movable in said arcuate slot to vary the angle between said land wheel and said frame; a hydraulic ram having one end operatively connected to said frame and the other end pivotally connected to said first parallel linkage structure, and link means operatively interposed between said parallel linkage structures so as to effect raising and lowering said frame relative to both said wheels by operation of said ram.

2. A disk tiller plow having a hitch element adapted for connection to a tractor, comprising: a frame extending diagonally to the line of travel, a gang of disks supported from said frame, a furrow wheel and a land wheel disposed at opposite ends, respectively, of said frame and of said disk gang, parallel linkage structures secured to opposite ends of said frame and extending longitudinally outwardly therefrom, a vertical spindle receiving sleeve mounted on the forward one of said linkage structures, said furrow wheel having an axle with a vertical spindle portion mounted in said sleeve, a steering arm on said vertical spindle portion of said furrow wheel connected to said hitch element, a land wheel supporting standard forming part of the rearward one of said linkage structures, said land wheel having an axle, vertical pivot means securing the free end of said axle to said standard, adjustable clamping means carried by said standard and spaced from said vertical pivot means and cooperative therewith to secure said axle rigidly to said standard, said clamping means being movable to swing said axle about the axis of said vertical pivot means to vary the angle between said land wheel and said frame, a hydraulic ram having one end pivotally connected to said frame and the other end pivotally connected to one of said linkage structures, and link means operatively interposed between said parallel linkage structures so as to effect raising and lowering said frame relative to both said wheels by operation of said ram.

3. A semimounted disk tiller plow, comprising: a frame carrying a gang of disks, a first vertically swingable parallel linkage structure pivotally connected to an end of said frame, a second vertically swingable parallel linkage structure pivotally connected to an opposite end of said frame, a land wheel, a furrow wheel, said land wheel and said furrow wheel each having an axle, one of said parallel linkage structures connected to the axle of said land wheel, and the other of said parallel linkage structures connected to the axle of said furrow wheel, said land wheel and said furrow wheel being the sole supporting wheels carried by said frame, a hydraulic ram having one end operatively connected to said frame and the other end pivotally connected to said first parallel linkage structure, and link means operatively interposed between said parallel linkage structures so as to effect raising and lowering of said frame relative to both of said wheels by operation of said ram.

4. A device as set forth in claim 3, wherein said link means includes a lost motion connection to permit relative floating movement between said gang of disks and said wheels.

5. A device as set forth in claim 3, wherein said parallel linkage structures at opposite ends of said frame each include adjustable stop means operatively interposed between said frame and at least one of said parallel links for limiting lowering movement of said frame relative to said wheels.

References Cited in the file of this patent

UNITED STATES PATENTS

| | | |
|---|---|---|
| 1,480,273 | Krotz | Jan. 8, 1924 |
| 1,491,119 | Van Sickle | Apr. 22, 1924 |
| 1,931,815 | Conley | Oct. 24, 1933 |
| 2,554,741 | Johnston | May 29, 1951 |
| 2,624,590 | Tilton | Jan. 6, 1953 |
| 2,635,519 | Cook | Apr. 21, 1953 |
| 2,718,184 | Morkoski | Sept. 20, 1955 |
| 2,754,743 | Ryden | July 17, 1956 |
| 2,778,290 | Greeson et al. | Jan. 22, 1957 |
| 2,879,854 | Gordon | Mar. 31, 1959 |

FOREIGN PATENTS

| | | |
|---|---|---|
| 166,639 | Australia | Jan. 23, 1956 |
| 835,368 | France | Dec. 20, 1938 |